United States Patent
Kobayashi (10) Patent No.: US 11,967,188 B2
(45) Date of Patent: Apr. 23, 2024

(54) VEHICLE MOUNTED UPDATE APPARATUS, UPDATE PROCESSING PROGRAM, AND PROGRAM UPDATE METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Naoto Kobayashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 474 days.

(21) Appl. No.: 17/280,018

(22) PCT Filed: Oct. 11, 2019

(86) PCT No.: PCT/JP2019/040163
§ 371 (c)(1),
(2) Date: Mar. 25, 2021

(87) PCT Pub. No.: WO2020/080273
PCT Pub. Date: Apr. 23, 2020

(65) Prior Publication Data
US 2022/0036670 A1    Feb. 3, 2022

(30) Foreign Application Priority Data
Oct. 16, 2018  (JP) .................................. 2018-195241

(51) Int. Cl.
G07C 5/08    (2006.01)
G06F 8/65    (2018.01)
G06F 8/71    (2018.01)

(52) U.S. Cl.
CPC ............. *G07C 5/0816* (2013.01); *G06F 8/65* (2013.01); *G06F 8/71* (2013.01); *G07C 5/0808* (2013.01)

(58) Field of Classification Search
CPC ....... G07C 5/0816; G07C 5/0808; G06F 8/65; G06F 8/71
(Continued)

(56) References Cited

U.S. PATENT DOCUMENTS 10,360,018 B2 * 7/2019 Komano ................. H04W 4/48
10,437,680 B2 10/2019 Kito et al.
2021/0349709 A1 * 11/2021 Nakatsukasa ........... G06F 8/656

FOREIGN PATENT DOCUMENTS

WO   2017-149825 A1   9/2017
WO   2018-154949 A1   8/2018

OTHER PUBLICATIONS

International Search Report, Application No. PCT/JP2019/040163, mailed Dec. 17, 2019. ISA/Japan Patent Office.

* cited by examiner

*Primary Examiner* — Isaac G Smith
(74) *Attorney, Agent, or Firm* — Honigman LLP (57) ABSTRACT

A vehicle-mounted update apparatus obtains update information and an update program transmitted from an outer-vehicle external server, and processes updating a program of a vehicle-mounted ECU. The vehicle-mounted update apparatus includes a control unit communicably connected to the vehicle-mounted ECU and controlling transmission of the update program to the vehicle-mounted ECU. The control unit determines, based on the update information, a transmission order for which the update programs are to be transmitted to the vehicle-mounted ECU, transmits the update program corresponding to a single update of the plurality of updates to the vehicle-mounted ECU, based on (Continued)

the determined transmission order, determines success or failure of the single update of the vehicle-mounted ECU, and transmits the update program next in the transmission order to the update program corresponding to the single update to the vehicle-mounted ECU, if the single update is determined as having succeeded.

7 Claims, 5 Drawing Sheets

(58) Field of Classification Search
USPC .......................................................... 701/29.1
See application file for complete search history.

FIG. 5

VEHICLE MOUNTED UPDATE APPARATUS, UPDATE PROCESSING PROGRAM, AND PROGRAM UPDATE METHOD

CROSS-REFERENCE TO RELATED APPLICATIONS

This application is the U.S. national stage of PCT/JP2019/040163 filed on Oct. 11, 2019, which claims priority of Japanese Patent Application No. JP 2018-195241 filed on Oct. 16, 2018, the contents of which are incorporated herein.

TECHNICAL FIELD

The present disclosure relates to a vehicle-mounted update apparatus, an update processing program, and a program update method.

BACKGROUND

Vehicle-mounted ECUs (Electronic Control Units) for controlling vehicle-mounted devices in systems such as power-train systems of engine control or the like and body systems of air conditioning control or the like are installed in a vehicle. The vehicle-mounted ECUs each include an arithmetic processing unit such as a micro processing unit (MPU), a re-writable, non-volatile storage unit such as a RAM, and a communication unit for communicating with another vehicle-mounted ECU, and control a vehicle-mounted device by reading and executing a control program stored in the storage unit thereof. Furthermore, a relay apparatus provided with a wireless communication function is mounted to the vehicle, and a control program of a vehicle-mounted ECU can be updated by communicating, via the relay apparatus, with a program providing apparatus connected to an outer-vehicle network and downloading (receiving) the control program of the vehicle-mounted ECU from the program providing apparatus (for example, see JP 2017-97851A).

The relay apparatus disclosed in JP 2017-97851A does not consider the case where a control program of a vehicle-mounted ECU is to be updated successively, and thus has the problem where, if an update fails when a plurality of updates are performed successively, it is difficult to revert to the control program that was running at the point in time at which the update was started.

It is an object of the present disclosure to provide a vehicle-mounted update apparatus and the like capable of appropriately dealing with updates to be performed successively by determining success or failure of an update when a program of a vehicle-mounted ECU is updated successively.

SUMMARY

An aspect of this disclosure is directed to a vehicle-mounted update apparatus for obtaining update information regarding a plurality of updates and an update program that are transmitted from an outer-vehicle external server, and performing processing for updating a program of a vehicle-mounted ECU installed in a vehicle. The vehicle-mounted update apparatus includes a control unit configured to be communicably connected to the vehicle-mounted ECU and to control transmission of the update program to the vehicle-mounted ECU. The control unit is configured to: determine, based on the update information, a transmission order in which update programs respectively corresponding to the plurality of updates are to be transmitted to the vehicle-mounted ECU; store, in a storage unit of the vehicle-mounted update apparatus, the determined transmission order in association with version numbers of the update programs; transmit the update program corresponding to a single update of the plurality of updates and a self-diagnosis processing program for the vehicle-mounted ECU to perform self-diagnosis processing to the vehicle-mounted ECU, based on the determined transmission order; determine success or failure of the single update of the vehicle-mounted ECU based on a result of the self-diagnosis processing performed by the vehicle-mounted ECU according to the self-diagnosis processing program; transmit the update program next in the transmission order to the update program corresponding to the single update to the vehicle-mounted ECU, if the single update is determined as having succeeded; and interrupt the plurality of updates without transmitting the update program next in order to the vehicle-mounted ECU, if the single update is determined as having failed.

Advantageous Effects of the Present Disclosure

According to an aspect of this disclosure, updates to be performed successively can be suitably dealt with by determining success or failure of an update when a program of a vehicle-mounted ECU is updated successively.

BRIEF DESCRIPTION OF DRAWINGS

FIG. 2 is a block diagram illustrating an example of a configuration of a vehicle-mounted update apparatus and the like.

DETAILED DESCRIPTION OF PREFERRED EMBODIMENTS

First, embodiments of the present disclosure will be listed and described. It is also possible that at least some of the following embodiments are combined as appropriate.

An aspect of this disclosure is directed to a vehicle-mounted update apparatus for obtaining update information regarding a plurality of updates and an update program that are transmitted from an outer-vehicle external server, and performing processing for updating a program of a vehicle-mounted ECU installed in a vehicle, the vehicle-mounted update apparatus including: a control unit configured to be communicably connected to the vehicle-mounted ECU and to control transmission of the update program to the vehicle-mounted ECU. The control unit is configured to: determine, based on the update information, a transmission order in which update programs respectively corresponding to the plurality of updates are to be transmitted to the vehicle-mounted ECU, transmit the update program corresponding to a single update of the plurality of updates to the vehicle-mounted ECU, based on the determined transmission order, determine success or failure of the single update of the vehicle-mounted ECU, and transmit the update program next in the transmission order to the update program corresponding to the single update to the vehicle-mounted ECU, if the single update is determined as having succeeded.

According to this aspect, even in the case where a plurality of updates are to be carried out successively, the control unit performs the next update once it has determined success or failure of the update of each single update. Accordingly, if a single update is successful, the control unit transmits the update program next in transmission order to the update program corresponding to the single update to the vehicle-mounted ECU, and thus even if a problem occurs with the update program next in the transmission order, the vehicle-mounted ECU can revert to the program (update program corresponding to the single update) successfully updated according to the previous successful single update. Also, if the single update fails, it is possible to prevent the program running at the point in time where the single update was started from being deleted due to the update program next in transmission order and prevent the update program next in transmission order from being stored in the storage unit of the corresponding vehicle-mounted ECU. Accordingly, as a result of determining success or failure of updates when the program of the vehicle-mounted ECU is updated successively, a plurality of updates performed successively can be suitably dealt with.

An aspect of this disclosure is directed to vehicle-mounted update apparatus, wherein, if the single update is determined as having failed, the control unit interrupts the plurality of updates without transmitting the update program next in the transmission order to the vehicle-mounted ECU.

According to this aspect, even in the case where a plurality of updates are to be carried out successively, the control unit is to perform the next update once it has determined success or failure of an update of each single update, and if a single update fails, the control unit interrupts the plurality of updates to be performed successively without transmitting the update program next in transmission order to the vehicle-mounted ECU. Accordingly, regardless of the single update having failed, it is possible to prevent the update program next in transmission order from being transmitted to the vehicle-mounted ECU and the program running at the point in time where the single update was started from being deleted and prevent the update program next in transmission order from being stored in the storage unit of the corresponding vehicle-mounted ECU. That is, an area for holding the program of the version running at the point in time when the single update was performed can be reliably secured in the storage unit of the vehicle-mounted ECU. Accordingly, in the case where a single update of a plurality of updates to be performed successively fails, the vehicle-mounted ECU can reliably revert to the program of the version running at the point in time when the single update was performed, and thus a plurality of updates to be performed successively can be suitably dealt with.

An aspect of this disclosure is directed to the vehicle-mounted update apparatus, wherein a storage unit of the vehicle-mounted ECU includes two storage areas for respectively storing a current version program currently being executed and an old version program previously executed, the vehicle-mounted ECU stores the update program transmitted from the control unit in the storage area in which the old version program is stored, switches the update program thus stored in the storage area as the current version program, and transmits information regarding a switch result, and the control unit determines success or failure of the single update of the vehicle-mounted ECU based on the information regarding the switch result transmitted from the vehicle-mounted ECU.

According to this aspect, the control unit determines success or failure of the single update of the vehicle-mounted ECU based on information regarding a switch result transmitted from the vehicle-mounted ECU, and thus the accuracy of this determination can be increased. The storage unit of the vehicle-mounted ECU includes two storage regions that respectively store the current version program currently being executed and the old version program previously executed, and the update program transmitted from the control unit is stored in the storage area in which the old version program is stored. The update program next in transmission order is not transmitted if switching to the update program transmitted from the control unit fails, and thus it is possible to maintain the state where the current version program (the program running at the point in time where the single update was started) is stored. The vehicle-mounted ECU can revert from the failed update program of the single update to the program (current version program) that was running at the point in time where the single update was started, and operate.

An aspect of this disclosure is directed to the vehicle-mounted update apparatus, wherein there are a plurality of the vehicle-mounted ECUs to which the update program corresponding to the single update is to be transmitted, and the control unit determines that the single update was successful if the switch result transmitted from all of the vehicle-mounted ECUs to which the update program corresponding to the single update is transmitted is normal.

According to this aspect, in the case where there are a plurality of vehicle-mounted ECUs to which an update program corresponding to the single update is to be transmitted, the programs of all of the plurality of vehicle-mounted ECUs need to be updated. Even in such a case, if the switching results transmitted from all of the vehicle-mounted ECUs to which the update program corresponding to the single update was transmitted are normal, the single update is determined as being successful, and thus the programs of all of the plurality of vehicle-mounted ECUs can be updated.

An aspect of this disclosure is directed to the vehicle-mounted update apparatus, wherein a storage unit of the vehicle-mounted ECU includes two storage areas for respectively storing a current version program currently being executed and an old version program previously executed, the vehicle-mounted ECU stores the update program transmitted from the control unit in the storage area in which the old version program is stored, and transmits information regarding a result of self-diagnosis performed on the update program thus stored in the storage area, and the control unit determines success or failure of the single update of the vehicle-mounted ECU based on the information regarding the self-diagnosis result transmitted from the vehicle-mounted ECU.

According to this aspect, the control unit determines success or failure of a single update performed by the vehicle-mounted ECU based on information regarding the self-diagnosis result transmitted from the vehicle-mounted ECU, and thus the accuracy of this determination can be increased.

An aspect of this disclosure is directed to the vehicle-mounted update apparatus, wherein there are a plurality of the vehicle-mounted ECUs to which the update program corresponding to the single update is to be transmitted, and the control unit determines that the single update was successful if the self-diagnosis result transmitted from all of the vehicle-mounted ECUs to which the update program corresponding to the single update was transmitted is normal.

According to this aspect, in the case where there are a plurality of vehicle-mounted ECUs to which the update program corresponding to the single update is to be transmitted, the programs of all of the plurality of vehicle-mounted ECUs need to be updated. Even in such a case, if the self-diagnosis results transmitted from all of the vehicle-mounted ECUs to which the update program corresponding to the single update was transmitted are normal, the single update is determined as being successful, and thus the programs of all of the plurality of the vehicle-mounted ECUs can be updated.

An aspect of this disclosure is directed to an update processing program for causing a computer to execute processing for: obtaining update information regarding a plurality of updates and an update program that are transmitted from an outer-vehicle external server; determining, based on the update information, a transmission order in which update programs respectively corresponding to the plurality of updates are to be transmitted to the vehicle-mounted ECU; transmitting the update program corresponding to a single update of the plurality of updates to the vehicle-mounted ECU, based on the determined transmission order; determining success or failure of the single update of the vehicle-mounted ECU; and transmitting the update program next in the transmission order to the update program corresponding to the single update to the vehicle-mounted ECU, if the single update is determined as having succeeded.

According to this aspect, a computer can be made to function as a vehicle-mounted update apparatus.

An aspect of this disclosure is directed to a program update method including: obtaining update information regarding a plurality of updates and an update program that are transmitted from an outer-vehicle external server; determining, based on the update information, a transmission order in which update programs respectively corresponding to the plurality of updates are to be transmitted to the vehicle-mounted ECU; transmitting the update program corresponding to a single update of the plurality of updates to the vehicle-mounted ECU, based on the determined transmission order; determining success or failure of the single update of the vehicle-mounted ECU; and transmitting the update program next in the transmission order to the update program corresponding to the single update to the vehicle-mounted ECU, if the single update is determined as having succeeded.

According to this aspect, a plurality of updates to be performed successively can be suitably dealt with by determining success or failure of an update when the program of a vehicle-mounted ECU is updated successively.

The following specifically describes the present disclosure based on the drawings illustrating embodiments thereof. A vehicle-mounted update apparatus 2 according to embodiments of the present disclosure will be described below with reference to the drawings. Note that the present disclosure is not limited to these examples, but is indicated by the scope of the claims, and all changes that come within the meaning and range of equivalency of the claims are intended to be embraced therein.

Embodiment 1

Figure 1:
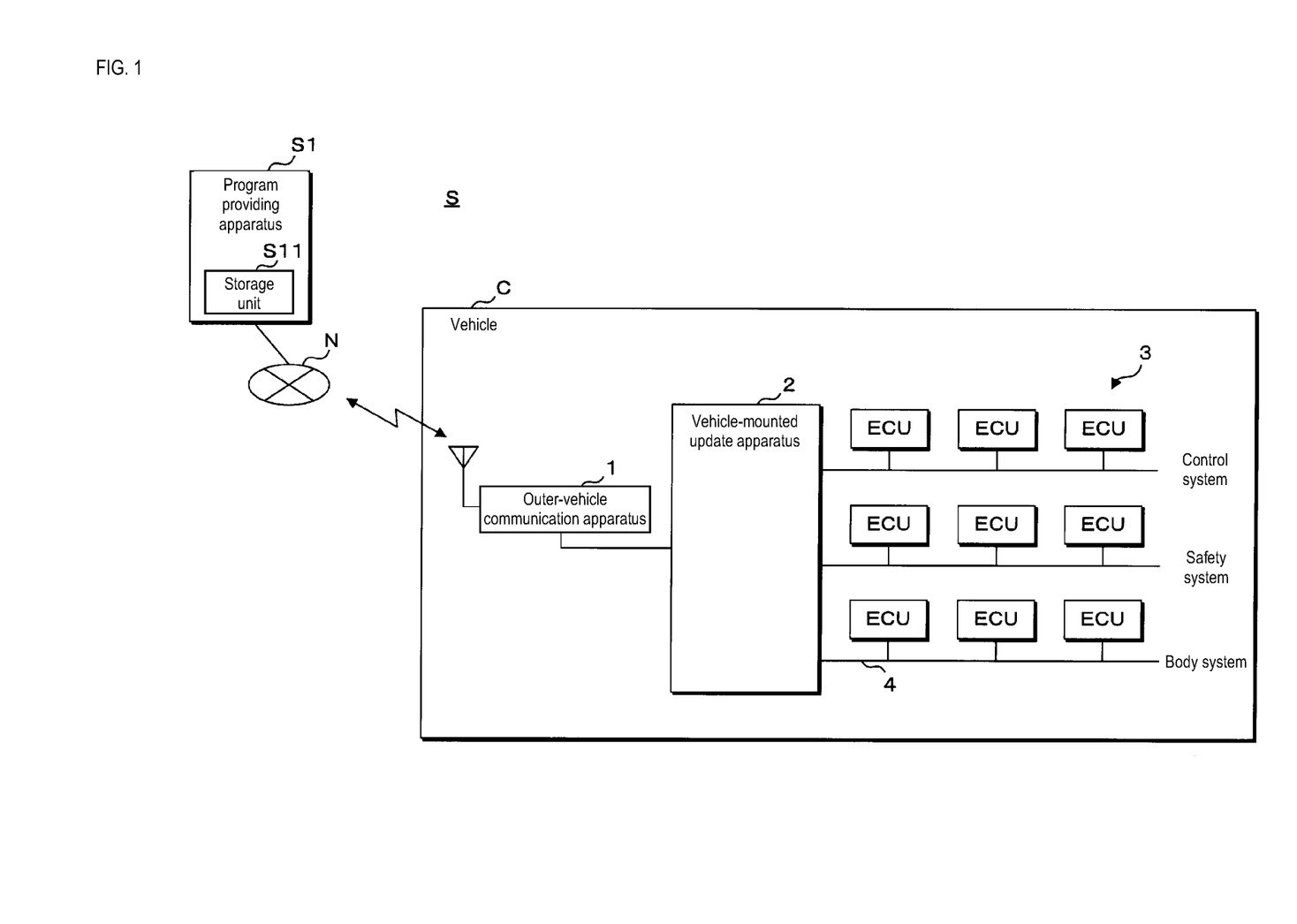
FIG. 1 is a schematic diagram illustrating an example of a configuration of a vehicle-mounted update system according to Embodiment 1.
Figure 2:
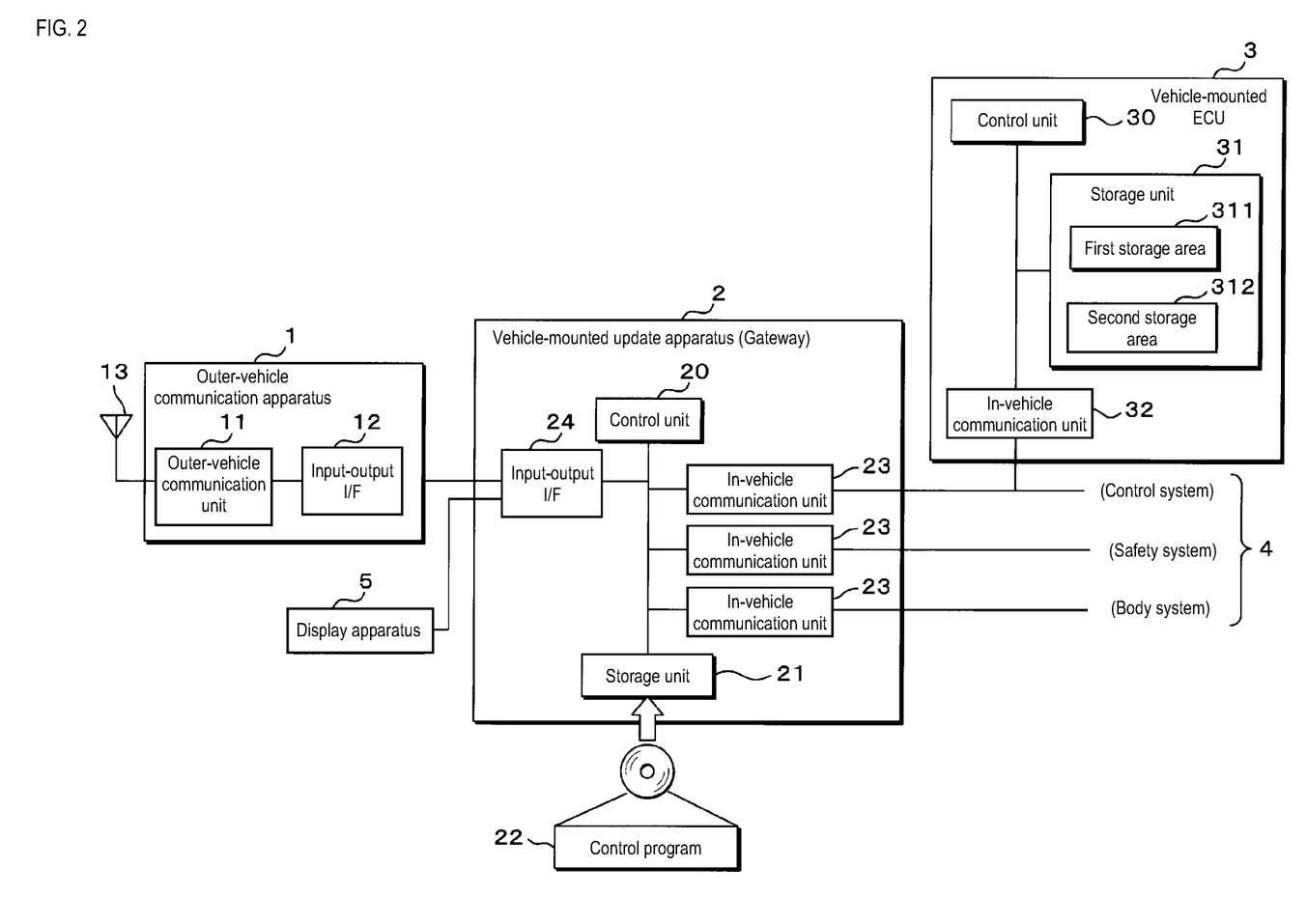

An embodiment is described below based on the drawings. FIG. 1 is a schematic diagram illustrating an example of a configuration of a vehicle-mounted update system according to Embodiment 1. FIG. 2 is a block diagram illustrating an example of a configuration of the vehicle-mounted update apparatus 2 and the like. A vehicle-mounted update system S includes an outer-vehicle communication apparatus 1 and the vehicle-mounted update apparatus 2 installed in a vehicle C, and transmits a program or data obtained from a program providing apparatus S1 connected thereto via an outer-vehicle network N to a vehicle-mounted ECU (Electronic Control Unit) 3 installed in the vehicle C.

The program providing apparatus S1 is, for example, a computer such as a server or the like connected to the outer-vehicle network N such as the internet, a public network, etc., is provided with a storage unit S11 realized by a RAM (Random Access Memory), a ROM (read only memory), a hard disk, or the like, and corresponds to an outer-vehicle external server. A program or data for controlling a vehicle-mounted ECU 3 is stored in the storage unit S11 of the program providing apparatus S1, the program or data being created by the manufacturer or the like of the vehicle-mounted ECU 3. As described below, the program or data is transmitted to the vehicle C as an update program, and is used to update a program or data of the vehicle-mounted ECU 3 installed in the vehicle C. The program providing apparatus S1 (external server) configured in this manner is also called an OTA (Over The Air) server. As a result of the vehicle-mounted ECU 3 installed in the vehicle C obtaining the update program transmitted wirelessly from the program providing apparatus S1, and applying the update program as a program to be executed, the program executed by the receiving ECU can be updated (re-programmed).

Below, the program will be described as including an external file in which a program code that includes control syntax and the like for the vehicle-mounted ECU 3 to perform processing, and data that is referred to when the program code is to be executed is described. When an update program is transmitted, an external file in which the above-mentioned program code and data is described is transmitted from the program providing apparatus S1 as, for example, an encoded archive file.

The outer-vehicle communication apparatus 1, the vehicle-mounted update apparatus 2, a display apparatus 5, and a plurality of vehicle-mounted ECUs 3 for controlling various vehicle-mounted devices are installed in the vehicle C. The outer-vehicle communication apparatus 1 and the vehicle-mounted update apparatus 2 are communicably connected to each other by a harness such as a serial cable or the like. The vehicle-mounted update apparatus 2 and the vehicle-mounted ECUs 3 are communicably connected to each other via an in-vehicle LAN 4 that supports a communication protocol such as CAN (Control Area Network/registered trademark) or Ethernet (registered trademark).

The outer-vehicle communication apparatus 1 includes an outer-vehicle communication unit 11 and an input-output I/F (interface) 12 for communicating with the vehicle-mounted update apparatus 2. The outer-vehicle communication unit 11 is a communication apparatus for performing wireless communication using a mobile radio communication protocol such as 3G, LTE, 4G, and WiFi, and transmits/receives data to/from the program providing apparatus S1 via an antenna 13 connected to the outer-vehicle communication unit 11. Communication between the outer-vehicle communication apparatus 1 and the program providing apparatus is performed via an external network such as a public network or the internet.

The input-output I/F 12 is a communication interface for performing serial communication, for example, with the vehicle-mounted update apparatus 2. The outer-vehicle communication apparatus 1 and the vehicle-mounted update apparatus 2 mutually communicate via the input-output I/F 12 and a harness such as a serial cable connected to the input-output I/F 12. In the present embodiment, the outer-vehicle communication apparatus 1 is a separate apparatus to the vehicle-mounted update apparatus 2, and these apparatuses are communicably connected to each other by the input-output I/F 12 and the like, but the present disclosure is not limited to this. The outer-vehicle communication apparatus 1 may be built into the vehicle-mounted update apparatus 2 as a constitutional part of the vehicle-mounted update apparatus 2.

The vehicle-mounted update apparatus 2 includes a control unit 20, a storage unit 21, and in-vehicle communication units 23. The vehicle-mounted update apparatus 2 is configured to obtain, from the outer-vehicle communication apparatus 1, an update program received by the outer-vehicle communication apparatus 1 from the program providing apparatus S1 through wireless communication, and transmit the update program to a predetermined vehicle-mounted ECU 3 (vehicle-mounted ECU 3 to be updated) via the in-vehicle LAN 4. The vehicle-mounted update apparatus 2 is a gateway (repeater) that integrates segments of a plurality of systems of a control-system vehicle-mounted ECU 3, a safety-system vehicle-mounted ECU 3, a body-system vehicle-mounted ECU 3, and the like, and relays communication between the vehicle-mounted ECUs 3 in these segments. Also, the vehicle-mounted update apparatus 2 may be configured as a functional unit of a body ECU that controls the entire vehicle C.

The control unit 20 is constituted by a CPU (Central Processing Unit), an MPU (Micro Processing Unit), or the like and is configured to perform various types of control processing and arithmetic processing by reading out and executing a control program and data stored in advance in the storage unit 21. The control unit 20 corresponds to an obtaining unit that obtains, via the outer-vehicle communication apparatus 1, update programs transmitted from the program providing apparatus S1.

The storage unit 21 is constituted by a volatile memory element such as a RAM (Random Access Memory), or a non-volatile memory element such as a ROM (Read Only Memory), an EEPROM (Electrically Erasable Programmable ROM), or a flash memory, and control programs and data that is referred to during processing are stored therein in advance. A control program stored in the storage unit 21 may be a stored control program read from a readable recording medium 22 by the vehicle-mounted update apparatus 2. Also, a control program may be downloaded from an un-shown external computer connected to an un-shown communication network and stored in the storage unit 21. Furthermore, the storage unit 21 stores configuration information regarding all vehicle-mounted ECUs 3 installed in the vehicle C, an update program obtained from the program providing apparatus S1, and information regarding the state of progress when an update program is being transmitted to a vehicle-mounted ECU 3.

The in-vehicle communication units 23 are input-output interfaces that use a communication protocol such as CAN (Control Area Network) or Ethernet (registered trademark), and the control unit 20 mutually communicates with the vehicle-mounted ECUs 3 connected to the in-vehicle LAN 4 or another vehicle-mounted device such as a relay apparatus, via the in-vehicle communication units 23. A plurality of in-vehicle communication units 23 are provided (three in the drawings), and communication lines forming the in-vehicle LAN 4 are respectively connected to the in-vehicle communication units 23. By providing a plurality of in-vehicle communication units 23 in this manner, the in-vehicle LAN 4 is divided into a plurality of segments, and a vehicle-mounted ECU is connected to each segment according to the function (control-system function, safety-system function, and body-system function) of the vehicle-mounted ECU.

Each vehicle-mounted ECU 3 includes a control unit 30, a storage unit 31, and an in-vehicle communication unit 32. The storage unit 31 is constituted by a volatile memory element such as a RAM (Random Access Memory), or a non-volatile memory element such as a ROM (Read Only Memory), an EEPROM (Electrically Erasable Programmable ROM), or a flash memory, and stores a program or data of the vehicle-mounted ECU 3. The program or data is to be updated by an update program transmitted from the vehicle-mounted update apparatus 2.

The storage unit 31 includes a first storage area (first plane) 311 and a second storage area (second plane) 312. The storage unit 31 stores two programs, namely, the program currently being executed (applied) by the vehicle-mounted ECU 3 (current version) and the program applied previous to the current version (old version). The current version program and the old version program are stored divided into either of the first storage area 311 and the second storage area 312. That is, if the current version program is stored in the first storage area 311, the old version program is stored in the second storage area 312. If the old version program is stored in the first storage area 311, the current version program is stored in the second storage area 312. In this way, by storing the current version program and the old version program in a so-called dual plane, even if there is a problem with the current version program, the reliability of the vehicle-mounted ECU 3 can be guaranteed by the control unit 30 reading and executing (switching to) the old version program that ran properly when it was previously applied.

The storage unit 31 stores information regarding the versions of both the current version program and the old version program and information regarding the area (work plane) where the currently executed (applied) program is stored. That is, if the program stored in the first storage area (first plane) 311 is currently being executed, the storage unit 31 stores the fact that the work plane is the first storage area (first plane) 311. If the program stored in the second storage area (second plane) 312 is currently being executed, the storage unit 31 stores the fact that the work plane is the second storage area (second plane) 312. The storage unit 31 stores configuration information regarding the corresponding ECU including version information regarding the programs (current version and old version) and information regarding the work plane, and information regarding the state of progress when receiving an update program from the vehicle-mounted update apparatus 2.

The control unit 30 is constituted by a CPU (Central Processing Unit), an MPU (Micro Processing Unit), or the like, and performs control processing etc., by reading out and executing a program and data stored in the storage unit 31 (work plane) to control a vehicle-mounted device including the vehicle-mounted ECU 3, an actuator, or the like.

The control unit 30 of the vehicle-mounted ECU 3 obtains an update program by receiving, via the in-vehicle communication unit 32, the update program transmitted from the vehicle-mounted update apparatus 2. Accordingly, the control unit 30 of the vehicle-mounted ECU 3 obtains the update program transmitted from the program providing apparatus S1 via the outer-vehicle communication apparatus 1 and the vehicle-mounted update apparatus 2. The control unit 30 stores the obtained update program in the storage area (first storage area 311 or second storage area 312) that is not the work plane. That is, in obtaining the update program transmitted from the vehicle-mounted update apparatus 2, the control unit 30 deletes the program stored in the storage area that is not the work plane (non-work plane) as processing in preparation for obtaining the update program. Normally, the program stored in the storage area that is not the work plane is the old version program executed prior to the current version program, and thus the old version can be deleted without stopping control functions performed by the vehicle-mounted ECU 3 on a vehicle-mounted apparatus. The control unit 30 deletes the old version program stored in the storage area that is not the work plane (non-work plane) and stores the update program transmitted from the vehicle-mounted update apparatus 2 in the non-work plane.

Upon normal termination of receiving of the update program, the control unit 30 of the vehicle-mounted ECU 3 switches the work plane and applies and executes the received update program as the current version program. In the case where the receiving of the update program is normally terminated and the work plane is properly switched, control unit 30 of the vehicle-mounted ECU 3 stores the fact that updating of the program is complete (normal termination) in the storage unit 31, and also transmits (makes a notification of) this fact to the vehicle-mounted update apparatus 2. If the work plane is properly switched, the control unit 30 determines that updating of the program is complete (normal termination), and thus the accuracy of this determination can be guaranteed.

Also, once receiving of the update program is normally terminated and the work plane is switched, the control unit 30 of the vehicle-mounted ECU 3 performs self-diagnosis processing that is based on the function of the vehicle-mounted ECU 3. A self-diagnosis processing program for performing self-diagnosis processing that is based on the function of the vehicle-mounted ECU 3 is stored in advance in the storage unit 31 of each of the vehicle-mounted ECUs 3. Further, the self-diagnosis processing program may be included in the update program and transmitted from the vehicle-mounted update apparatus 2 along with the update program.

If the result of the self-diagnosis processing performed on the update program thus switched is normal, the control unit 30 may store the fact that updating of the program is complete (normal termination) in the storage unit 31, and also transmit (make a notification of) this fact to the vehicle-mounted update apparatus 2. In the case where the self-diagnosis processing result is normal, the control unit 30 determines that the update of the program is complete (normal termination), and thus the accuracy of this determination can be further increased.

Also, if self-diagnosis processing is performed on the update program stored in the storage area that is the non-work plane before receiving of the update program is normally terminated and the work plane is switched and the result of the self-diagnosis processing performed on the update program is normal, the control unit 30 of the vehicle-mounted ECU 3 stores the fact that the program update is complete (normal termination) in the storage unit 31, and also transmits (makes a notification of) this fact to the vehicle-mounted update apparatus 2. Because the control unit 30 performs self-diagnosis processing on the update program stored in the storage area that is the non-work plane before receiving of the update program is normally terminated and the work plane is switched, that is, before the update program is applied, success or failure of an update according to an update program can be determined without the operations of a control function currently executed on a vehicle-mounted apparatus by the vehicle-mounted ECU 3 being affected.

In the case where switching to the update program has failed, or the case where the result of self-diagnosis processing performed on the update program indicates an abnormality, the control unit 30 of the vehicle-mounted ECU 3 performs rollback processing, that is, switches the storage area that is the non-work plane in which the program of the previous version (old version) of the update program is stored as the storage area that is the work plane (rollback), and executes (applies) the program of the previous version. In the case where switching to the update program has failed, or the case where the self-diagnosis processing result regarding the update program indicates an abnormality, the control unit 30 of the vehicle-mounted ECU 3 may store the fact that the update failed (abnormal termination) in the storage unit 31, and also transmit (make a notification of) this fact to the vehicle-mounted update apparatus 2.

The program of the previous version to that of the update program is the program being executed when the update program is transmitted, and thus is a program with operation results. Accordingly, even if updating of the update program fails, as a result of the control unit 30 performing rollback processing, the program is restored (work plane is switched) to one with operation results, and the program is executed, and thus control functions performed on a vehicle-mounted apparatus can be continued.

Determination of success or failure of an update according to the update program by the control unit 30 of the vehicle-mounted ECU 3 was described as a determination based on switching to the update program (switching of work plane) or the self-diagnosis processing result, but the determination is not limited to this. The control unit 30 of the vehicle-mounted ECU 3 may determine that an update was successful if no abnormality caused by the update program is detected in the period from when the update program is switched to and executed to, for example, when a predetermined period has passed, or to when the value of the cumulative running time of the vehicle C, the number of trips, the distance travelled, and the like reaches a predetermined value.

The display apparatus 5 is an HMI (Human Machine Interface) apparatus such as a car navigation display, for example. The display apparatus 5 is communicably connected to an input-output I/F 24 of the vehicle-mounted update apparatus 2 by a harness such as a serial cable. The display apparatus 5 displays data or information output from the control unit 20 of the vehicle-mounted update apparatus 2 via the input-output I/F 24. The connection mode between the display apparatus 5 and the vehicle-mounted update apparatus 2 is not limited to a connection mode realized by the input-output I/F 24 or the like, and the connection mode may be one where the display apparatus 5 and the vehicle-mounted update apparatus 2 are connected via the in-vehicle LAN 4.

Figure 3:
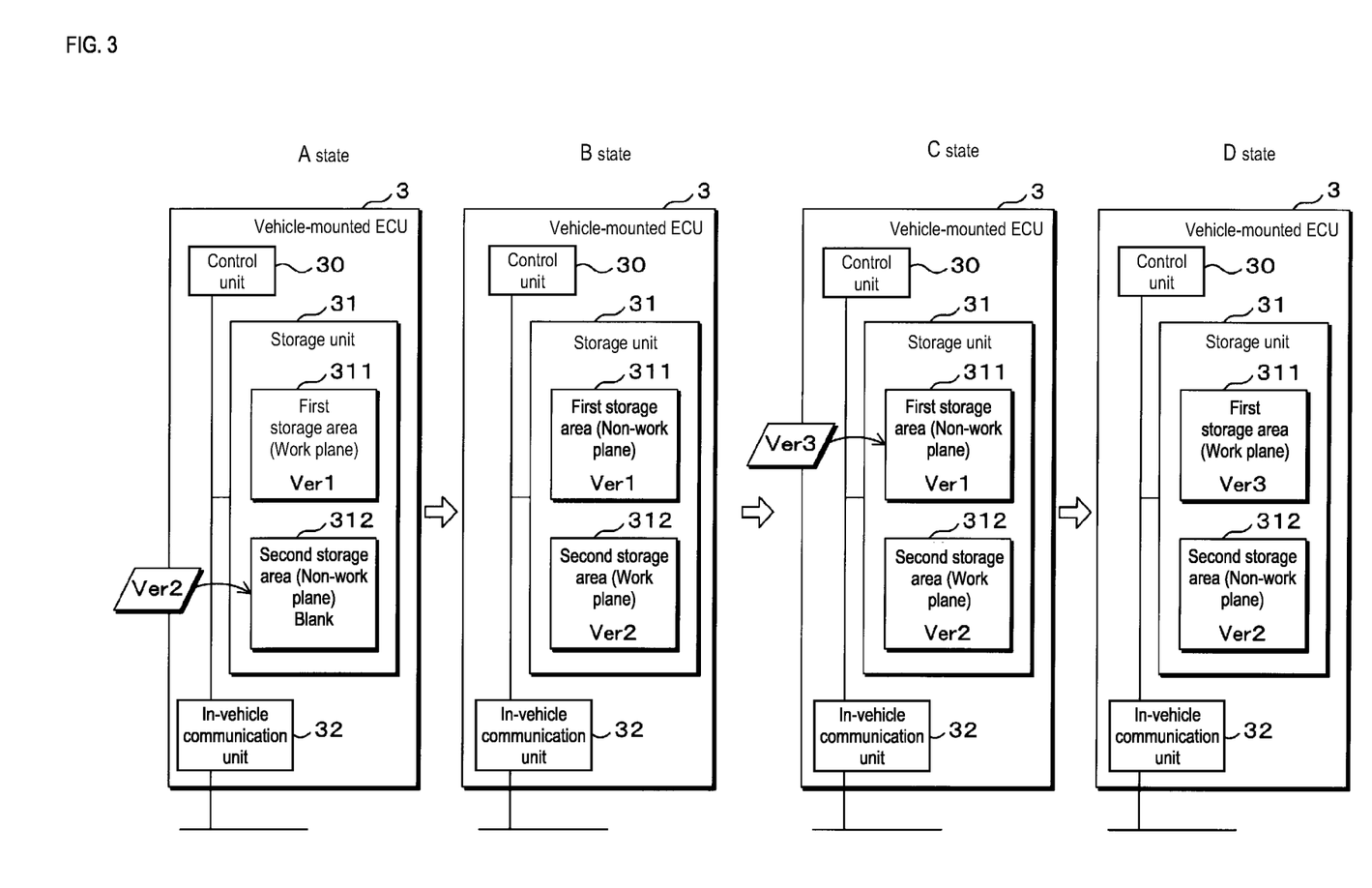
FIG. 3 is a descriptive diagram illustrating an example of an aspect of switching of work planes of a vehicle-mounted ECU.

FIG. 3 is a diagram illustrating an example of a mode of switching of the work plane of the vehicle-mounted ECU 3. The mode of the switching of the work plane of the vehicle-mounted ECU 3 shown in FIG. 3 describes a case where there is more than one update program (two in FIG.

3), and a plurality of updates respectively according to the plurality of update programs are performed successively.

In the program providing apparatus S1, two update programs, which are a Ver2 program and a Ver3 program, are prepared as update programs for the vehicle-mounted ECU 3. Based on update information obtained from the program providing apparatus S1, the vehicle-mounted update apparatus 2 specifies the number of update programs and the vehicle-mounted ECU 3 to which the update programs are to be transmitted, and determines the transmission order in which the update programs are to be transmitted to the vehicle-mounted ECU 3. The vehicle-mounted update apparatus 2 uses, for example, the version number of each update program or the date and time at which each update program was saved to the program providing apparatus S1 (etc.) to determine a transmission order such that the update programs are transmitted in order from the oldest. In FIG. 3, the vehicle-mounted update apparatus 2 determines a transmission order in which the Ver2 program is transmitted first and the Ver3 program is transmitted second.

An initial state (A state) of the vehicle-mounted ECU 3 is one where a Ver1 program is stored in the first storage area 311 acting as the work plane, and nothing is stored in the second storage area 312 acting as the non-work plane. The vehicle-mounted ECU 3 receives and obtains the Ver2 program, which is an update program, transmitted (relayed) from the vehicle-mounted update apparatus 2, and stores the Ver2 program in the second storage area 312, which is the non-work plane.

As a result of the vehicle-mounted ECU 3 switching the work plane from the first storage area 311 to the second storage area 312 and executing the Ver2 program (update program) stored in the second storage area 312 as the current version program, the first single update of the plurality of updates to be successively carried out is completed (B state). The vehicle-mounted ECU 3 notifies the vehicle-mounted update apparatus 2 of the fact that a single update has been completed (normal termination).

The vehicle-mounted update apparatus 2 that has obtained the notification from the vehicle-mounted ECU 3 indicating completion of the update transmits the Ver3 program, which is next in the transmission order, to the vehicle-mounted ECU 3 to start the next single update of the plurality of updates to be performed successively. The vehicle-mounted ECU 3 receives and obtains the Ver3 program, which is the update program transmitted from the vehicle-mounted update apparatus 2, and stores the Ver3 program in the first storage area 311 which is the non-work plane (C state).

As a result of the vehicle-mounted ECU 3 switching the work plane from the second storage area 312 to the first storage area 311 and executing the Ver3 program (update program) stored in the first storage area 311 as the current version program, the next single update of the plurality of updates to be performed successively is completed (D state). The vehicle-mounted ECU 3 notifies the vehicle-mounted update apparatus 2 of the fact that the single update has been completed (normal termination).

A situation where there are a plurality of update programs and a plurality of updates are to be performed successively occurs in cases where, for example, the operator of the vehicle C has not driven the vehicle C for an extended period of time, the vehicle C has not been able to wirelessly communicate with the program providing apparatus S1 for an extended period of time, the operator did not allow a plurality of updates, and the like. Application of an update program includes, in addition to a case where the update program is applied after replacing an entire program itself, a case where a portion of the program is replaced and the difference of the update program to the previous version program is applied. Accordingly, for example, in applying the Ver2 program and the Ver3 program starting from the Ver1 program, there are cases where the Ver3 program cannot be applied without applying the Ver2 program, and thus a plurality of updates need to be performed successively.

To address this, even in the case where a plurality of updates are performed as described above, the vehicle-mounted update apparatus 2 is configured to determine success or failure of each individual update (single update) each time an individual update (single update) is performed, and if an update is successful, start the next single update (transmit the next update program in the transmission order). Accordingly, despite a single update having failed, it is possible to prevent the update program next in the transmission order from being transmitted to the vehicle-mounted ECU 3 and the update program next in the transmission order from being stored in the storage area that is the non-work plane. The program version running at the point in time when a single update is performed, that is, the program determined as being successfully updated in the update immediately prior to the single update that failed is stored (held) in the storage area that is the non-work plane. Accordingly, even if a single update fails, the vehicle-mounted ECU 3 can revert (rollback) to the program determined as being successfully updated in the update immediately prior to the failed single update.

Figure 4:
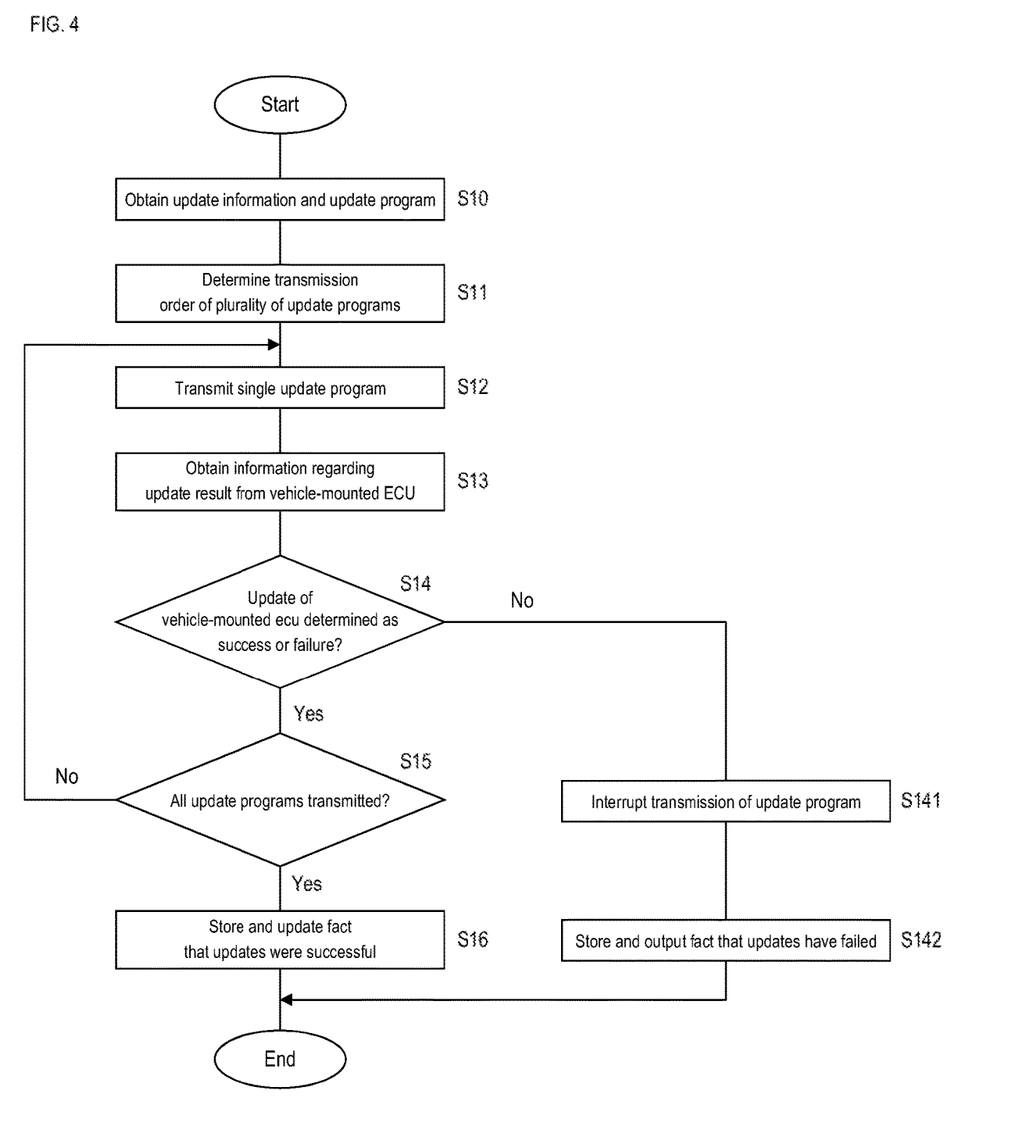
FIG. 4 is a flowchart illustrating an example of processing performed (on only one vehicle-mounted ECU) by a control unit of a vehicle-mounted update apparatus.

FIG. 4 is a flowchart illustrating processing performed (on only one vehicle-mounted ECU 3) by the control unit 20 of the vehicle-mounted update apparatus 2. The control unit 20 of the vehicle-mounted update apparatus 2 constantly communicates with the program providing apparatus S1 via the outer-vehicle communication apparatus 1 and performs the below-described processing in cases where the charged amount of a power storage apparatus (not shown) of the vehicle-mounted update apparatus 2 is at or above a predetermined value irrespective of whether the vehicle C is in an ignition state (IG switch ON) or in a stopped state (IC switch OFF).

The control unit 20 of the vehicle-mounted update apparatus 2 obtains update information and an update program (step S10). The control unit 20 of the vehicle-mounted update apparatus 2 communicates with the program providing apparatus S1 via the outer-vehicle communication apparatus 1, checks whether or not there is any update information, and obtains the corresponding update program if there is update information. The control unit 20 specifies the vehicle-mounted ECU 3 to be updated based on the obtained update information. A plurality of pieces of update information means that there are a plurality of update programs. The update information includes, for example, the version number of an update program, the date and time when an update program was saved to the program providing apparatus S1, information regarding the vehicle-mounted ECU 3 that is to apply the update program, the file size of the program, and the like. The update information is not limited to a case where it is a data file separate from the update program. The update information may be included in the data file of an update program as header information, for example. In the case where there are a plurality of update programs, with reference to update information or based on the number of update programs stored in the program providing apparatus S1, the control unit 20 obtains the update information regarding the plurality of updates and the update programs from the program providing apparatus S1.

The control unit 20 of the vehicle-mounted update apparatus 2 determines the transmission order of the plurality of update programs (step S11). The control unit 20 determines the transmission order of the plurality of update programs based on the obtained update information regarding the plurality of updates or update programs. The update information includes the version number of each obtained update program or the date and time when a program was saved to the program providing apparatus S1. The control unit 20 determines the transmission order of the plurality of update programs such that the update programs are transmitted in order of version number or from the oldest date and time. For example, in the case where three update programs are obtained with the version numbers ver2, ver2.1a, and ver3, the control unit 20 determines the transmission order to be one where the ver2 update program is transmitted first, the ver2.1a program is transmitted second, and the ver3 program is transmitted third. The control unit 20 stores the determined transmission order in association with the version numbers of the update programs in the storage unit 21.

The control unit 20 of the vehicle-mounted update apparatus 2 transmits a single update program (step S12). The control unit 20 starts transmission of the single update program based on the transmission order determined in step S11. In performing a plurality of updates successively, there are a plurality of update programs to be transmitted to the vehicle-mounted ECU 3, but the control unit 20 transmits a single update program based on the transmission order. A single update program is an update program corresponding to a single update of updates to be performed successively. In transmitting the single update program, the control unit 20 stores the fact that the single update program is in a transmission state in the storage unit 21.

In starting update program transmission, the control unit 20 may establish a session with the vehicle-mounted ECU 3 that is the transmission destination. In the processing in step S10, it was described that the control unit 20 specifies the vehicle-mounted ECU 3 to be updated based on obtained update information, but the present disclosure is not limited to this. For example, the control unit 20 can use multicast to transmit a predetermined packet or message generated based on update information to all vehicle-mounted ECUs 3 installed in the vehicle C. Then, the control unit 20 may specify the vehicle-mounted ECUs 3 that responded by replying to the multicast with configuration information (identification information) regarding the corresponding ECU as the vehicle-mounted ECUs 3 to be updated, and store the fact that updating of the vehicle-mounted ECUs 3 that are to be updated has been started (the vehicle-mounted ECUs 3 are being updated) in the storage unit 21.

The control unit 20 of the vehicle-mounted update apparatus 2 obtains information regarding the result of an update from the vehicle-mounted ECU 3 (step S13). The vehicle-mounted ECU 3 receives (obtains) the single update program transmitted in step S12, and if an update according to the obtained update program is successful, the vehicle-mounted ECU 3 transmits (makes a notification of) the fact that the update was successful to the vehicle-mounted update apparatus 2. If an update according to the obtained update program fails, the vehicle-mounted ECU 3 transmits (makes a notification of) the fact that the update failed to the vehicle-mounted update apparatus 2. The vehicle-mounted ECU 3 determines success or failure of an update according to the success or failure of a switch made to an update program or the result of self-diagnosis processing performed on an update program, for example.

The control unit 20 of the vehicle-mounted update apparatus 2 determines whether an update of the vehicle-mounted ECU 3 succeeded or failed (step S14). If a transmission (notification) indicating that an update was successful is received from the vehicle-mounted ECU 3, the control unit 20 determines that the update of the vehicle-mounted ECU 3 was successful according to the thus transmitted single update program. If a transmission (notification) indicating that an update was successful is not made from the vehicle-mounted ECU 3, the control unit 20 determines that the update of the vehicle-mounted ECU 3 failed according to the thus transmitted single update program.

If the update of the vehicle-mounted ECU 3 is determined as having succeeded (step S14: YES), the control unit 20 of the vehicle-mounted update apparatus 2 determines whether all of the update programs have been transmitted (step S15). If it is determined that an update of the vehicle-mounted ECU 3 was successful, the control unit 20 changes the state of the update program stored in the storage unit 21 from "transmitting" to "transmission complete". The control unit 20, for example, in response to the update program last in the transmission order entering a transmission complete state, determines that all update programs corresponding to the plurality of updates to be performed successively have been transmitted.

If it is determined that all of the update programs have been transmitted (step S15: YES), the control unit 20 of the vehicle-mounted update apparatus 2 stores and outputs the fact that the plurality of updates were successful (step S16). If it is determined that all of the update programs corresponding to the plurality of updates have been transmitted, the control unit 20 stores the fact that the plurality of updates performed successively were successful in the storage unit 21, and outputs (transmits) the fact that the plurality of updates performed successively were successful to the program providing apparatus S1 or the display apparatus 5. By outputting (transmitting) the fact that the plurality of updates performed successively were successful to the program providing apparatus S1 or the display apparatus 5, the administrator of the program providing apparatus S1 or the operator of the vehicle C can be informed of the fact that the plurality of updates performed successively were successful.

If it is determined that not all of the update programs have been transmitted (step S15: NO), that is, in the case where the transmission of all of the update programs corresponding to the plurality of updates is not complete when a plurality of updates are performed successively, the control unit 20 of the vehicle-mounted update apparatus 2 performs loop processing in order to execute the processing performed in step S12 again. In executing the processing in step S12 again through loop processing, the control unit 20 transmits the update program that is next in transmission order to the update program transmitted immediately prior. The control unit 20 of the vehicle-mounted update apparatus 2 stores in the storage unit 21 the state of the update program for which transmission has been completed, that is, the state of the update program with which the vehicle-mounted ECU 3 was successfully updated, as "transmission complete". The control unit 20 refers to the storage unit 21, and transmits the update programs of which transmission is not complete to the vehicle-mounted ECU 3 based on the transmission order. By performing loop processing in this manner, even if there are a plurality of update programs, the plurality of update programs can be transmitted to the vehicle-mounted ECU 3 in order based on the transmission order determined in step S11.

If it is determined that an update of the vehicle-mounted ECU 3 has failed (step S14: NO), the control unit 20 of the vehicle-mounted update apparatus 2 interrupts update program transmission (step S141). If it is determined that an update of the vehicle-mounted ECU 3 has failed, the control unit 20 interrupts update program transmission to the vehicle-mounted ECU 3. That is, in the case where it is determined that an update of the vehicle-mounted ECU 3 has failed, the control unit 20 interrupts the plurality of updates to be performed successively without transmitting the update program next in the transmission order to the vehicle-mounted ECU 3. The control unit 20 interrupts the transmission of an update program to the vehicle-mounted ECU 3, and thus the program stored in the work plane of the memory unit 31 of the vehicle-mounted ECU 3 at the point in time where transmission of the update program for which the update thereof is determined to have failed was started is stored (held) in first storage area 311 or the second storage area 312 of the vehicle-mounted ECU 3. Accordingly, even in the case where an update according to a transmitted update program fails, the vehicle-mounted ECU 3 can continue control functions performed on a vehicle-mounted apparatus by reverting (rolling back) to the program executed at the point in time when the update program that failed was transmitted.

In interrupting the update program transmission, the control unit 20 may delete the update information and update program stored in the storage unit 21. As a result of the control unit 20 deleting the update information and update program stored in the storage unit 21, free space of the storage unit 21 can be kept from becoming tight.

The control unit 20 of the vehicle-mounted update apparatus 2 stores and outputs the fact that the plurality of updates have failed (step S142). The control unit 20 stores the fact that plurality of updates to be performed successively have failed in the storage unit 21, and outputs (transmits) this fact to the program providing apparatus S1 or the display apparatus 5. The control unit 20 may include, in the information regarding the fact that the plurality of updates failed, information (configuration information) such as identification information regarding the vehicle-mounted ECU 3 to be updated, information regarding the update program for which the update succeeded, or information regarding the update program for which the update failed, or all of this information. By outputting (transmitting) the fact that the plurality of updates have failed to the program providing apparatus S1 or the display apparatus 5, the administrator of the program providing apparatus S1 or the operator of the vehicle C can be informed of the fact that the plurality of updates to be performed successively failed.

Embodiment 2

Figure 5:
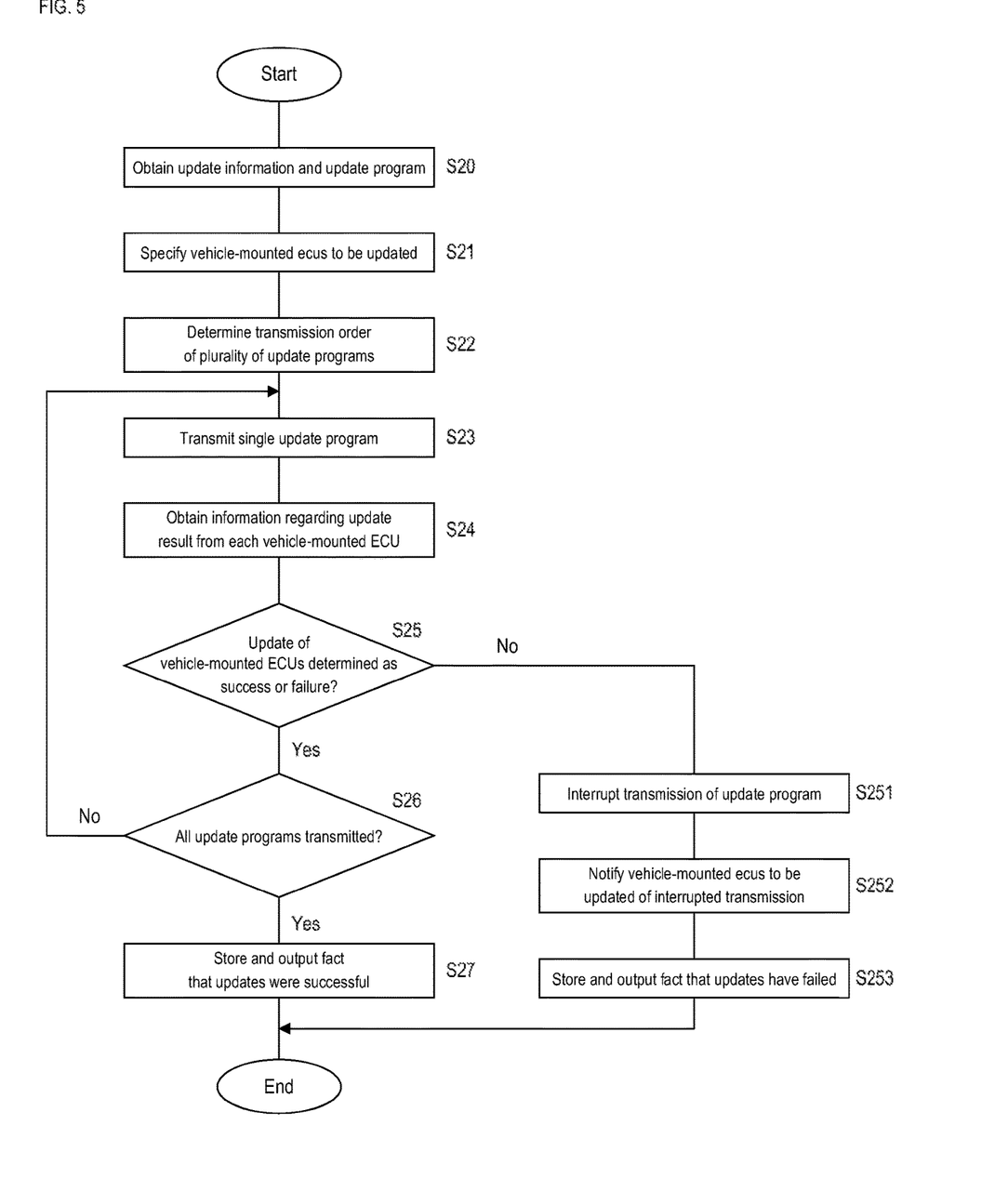
FIG. 5 is a flowchart illustrating an example of processing performed (on a plurality of vehicle-mounted ECUs) by a control unit of a vehicle-mounted update apparatus according to Embodiment 2.

FIG. 5 is a flowchart illustrating processing performed (on a plurality of vehicle-mounted ECUs 3) by the control unit 20 of the vehicle-mounted update apparatus 2 according to Embodiment 2. The processing performed by the control unit 20 of the vehicle-mounted apparatus 2 according to Embodiment 2 differs from that in Embodiment 1 in the fact that it applies to a plurality of vehicle-mounted ECUs 3 to be updated.

Similarly to the processing (step S10) performed in Embodiment 1, the control unit 20 of the vehicle-mounted update apparatus 2 obtains update information and update programs (step S20).

The control unit 20 of the vehicle-mounted update apparatus 2 specifies the plurality of vehicle-mounted ECUs 3 that are to be updated (step S21). The update information includes, for example, the version number of an update program, the date and time when an update program was saved to the program providing apparatus S1, information regarding the vehicle-mounted ECU 3 that is to apply the update program, the file size of a program, and the like, and the control unit 20 specifies the plurality of vehicle-mounted ECUs 3 that are to be updated.

In the case where a plurality of vehicle-mounted ECUs 3 operate cooperatively, correlation needs to be ensured between programs such that programs executed by the plurality of vehicle-mounted ECUs 3 are of the same version number or the same generation. Accordingly, when a plurality of updates are to be performed successively, there are cases where there are a plurality of vehicle-mounted ECUs 3 that are to be updated in each individual update (single update). Thus, the control unit 20, in performing the plurality of updates successively, specifies the plurality of vehicle-mounted ECUs 3 that are to be updated, based on obtained update information, and stores identification information for identifying the plurality of specified vehicle-mounted ECUs 3 in the storage unit. The identification information for identifying the vehicle-mounted ECUs 3 is, for example, a serial number given at the time the vehicle-mounted ECU 3 was manufactured or a MAC (Media Access Control) address if an in-vehicle communication unit 32 of the vehicle-mounted ECU 3 employs Ethernet.

Similarly to the processing (step S11) performed in Embodiment 1, the control unit 20 of the vehicle-mounted update apparatus 2 determines the transmission order of the plurality of update programs (step S22). For example, in the case where a plurality of updates are to be performed successively on three vehicle-mounted ECUs 3 working cooperatively, update programs respectively corresponding to the three vehicle-mounted ECUs 3 need to be transmitted in each individual update (each single update). The control unit 20 may define the update programs to be respectively transmitted to the plurality of vehicle-mounted ECUs 3 to be updated in each individual update (single update) as an update program group and store the update program group in the storage unit 21, and determine a transmission order for the update program group.

Similarly to processing (step S12) performed in Embodiment 1, the control unit 20 of the vehicle-mounted update apparatus 2 transmits single update programs (step S23). The control unit 20 respectively transmits update programs (single update programs) corresponding to a single update to the vehicle-mounted ECUs 3 that are to be updated, based on the transmission order. The update programs corresponding to the single update are defined as an update program group as described above.

Similarly to the processing (step S13) performed in Embodiment 1, the control unit 20 of the vehicle-mounted update apparatus 2 obtains information regarding the update results from each of the vehicle-mounted ECUs 3 (step S24). Update programs are transmitted to the plurality of vehicle-mounted ECUs 3, and the control unit 20 obtains information regarding update results from each of the plurality of vehicle-mounted ECUs 3 to which the update programs were transmitted. Each of the plurality of vehicle-mounted ECUs 3 to which the update programs were transmitted transmit (make a notification of) information regarding success or failure of an update according to the update program obtained in a similar manner to that in Embodiment 1, to the vehicle-mounted update apparatus 2.

The control unit 20 of the vehicle-mounted update apparatus 2 determines whether the update of each of the vehicle-mounted ECUs 3 succeeded or failed (step S25), similarly to the processing (step S14) performed in Embodiment 1. If a transmission (notification) is received from all of the vehicle-mounted ECUs 3 (all vehicle-mounted ECUs 3 to be updated) to which the single update programs were transmitted (single update program group) indicating a successful update, the control unit 20 determines that updates of all of the vehicle-mounted ECUs 3 to be updated were successful according to the thus transmitted single update programs.

In the case where a transmission (notification) indicating a successful update is not received from all of the vehicle-mounted ECUs 3 (all vehicle-mounted ECUs 3 to be updated) to which the single update programs were transmitted (single update program group), the control unit 20 determines that updates of all of the vehicle-mounted ECUs 3 to be updated were not successful according to the thus transmitted single update programs. That is, even in a case where a transmission (notification) indicating that an update was successful is not made from only one of the vehicle-mounted ECUs 3 out of the plurality of vehicle-mounted ECUs 3 to be updated, the control unit 20 determines that updates were not successful according to the single update programs (single update program group), that is, the updates failed.

In individual updates (each single update), determination of success or failure of an update is performed for each update program (update program group) transmitted to the plurality of vehicle-mounted ECUs 3 to be updated, and thus the plurality of updates can be performed successively while ensuring correlation between the programs of each of the vehicle-mounted ECUs 3.

In the case where it has been determined that the updates of all of the vehicle-mounted ECUs 3 to be updated were successful (step S25: YES), the control unit 20 of the vehicle-mounted update apparatus 2 determines whether all of the update programs have been transmitted (step S26), similarly to processing (step S15) performed in Embodiment 1. That is, in performing a plurality of updates successively on the plurality of vehicle-mounted ECUs 3 to be updated, the control unit 20 determines whether all of the update program groups have been transmitted.

In the case where it is determined that all of the update programs (update program groups) have been transmitted (step S26: YES), the control unit 20 of the vehicle-mounted update apparatus 2 stores and outputs the fact that the plurality of updates were successful (step S27), similarly to processing (step S16) performed in Embodiment 1.

In the case where it is determined that all of the update programs (update program groups) have not been transmitted (step S26: NO), that is, a case where, in performing the plurality of updates successively, the transmission of all update programs (update program groups) corresponding to the plurality of updates is not complete, the control unit 20 of the vehicle-mounted update apparatus 2 performs loop processing in order to execute the processing in step S23 again.

Similarly to Embodiment 1, the control unit 20 stores whether the state of transmission in units of update programs or transmission in units of update program groups is, for example, "transmitting" or "transmission complete" in the storage unit 21. The control unit 20 transmits update programs (update program group) of which transmission is not complete to the vehicle-mounted ECU 3 based on the transmission order. By performing loop processing in this way, even in the case where a plurality of vehicle-mounted ECUs 3 are to undergo a plurality of consecutive updates, the update program group to be transmitted to the plurality of vehicle-mounted ECUs 3 for each individual update can be transmitted to the vehicle-mounted ECUs 3 in order based on the transmission order determined in step S22.

In the case where it is determined that an update of all of the vehicle-mounted ECUs 3 to be updated was not successful (step S25: NO), that is, in the case where it is determined that the update of any one vehicle-mounted ECU 3 was not successful, the control unit 20 of the vehicle-mounted update apparatus 2 interrupts update program transmission (step S251), similarly to processing (step S141) performed in Embodiment 1. In the case where it is determined that an update of any one vehicle-mounted ECU 3 has failed, the control unit 20 interrupts the transmission of update programs (update program groups) to the plurality of vehicle-mounted ECUs 3, that is, interrupts the plurality of updates to be performed successively without transmitting update programs (update program groups).

The control unit 20 of the vehicle-mounted update apparatus 2 notifies the plurality of vehicle-mounted ECUs 3 that are to be updated that transmission has been interrupted (step S252). The control unit 20 transmits (makes a notification) to the plurality of vehicle-mounted ECUs 3 that are to be updated information indicating that transmission of the following update program(s) has been interrupted due to an update of any one of the plurality of vehicle-mounted ECUs 3 of the vehicle-mounted ECUs 3 to be updated having failed. The update program transmitted for the single update determined as having failed and the program executed at the time the failed update program was transmitted are stored in the first storage area 311 and the second storage area 312 of each of the plurality of vehicle-mounted ECUs 3 that obtained (received) the notification of interruption of transmission from the vehicle-mounted update apparatus 2. This failed update program is stored in the storage area of the work plane. The program executed at the time this failed update program was transmitted (corresponding to the previous version program of this failed update program) is stored in the storage area of the non-work plane. Each of the plurality of vehicle-mounted ECUs 3 that obtained notification of interruption of transmission from the vehicle-mounted update apparatus 2 switch the work plane, revert (rollback) to the program executed at the time the update program of the single update determined as having failed was transmitted, and execute the program thus reverted to.

Accordingly, even in a case where an update program (update program group) is transmitted to each of the plurality of vehicle-mounted ECUs 3 to be updated for a single update and an update of only one of the vehicle-mounted ECUs 3 according to the update program fails, processing is performed on all of the vehicle-mounted ECUs 3 to be updated to revert (roll back) to the program executed at the point in time this failed update program was transmitted. As a result of all of the vehicle-mounted ECUs 3 that are to be updated performing rollback processing, correlation between the programs of each of the vehicle-mounted ECUs 3 can be ensured.

The control unit 20 of the vehicle-mounted update apparatus 2 stores and outputs the fact that the plurality of updates have failed (step S253), similar to processing (step S142) performed in Embodiment 1.

In Embodiment 1 and Embodiment 2, the control unit 20 of the vehicle-mounted update apparatus 2 were described as determining, based on an update result transmitted from a vehicle-mounted ECU 3, success or failure of an update (single update) according to an individual update program of a plurality of updates to be performed successively, but the present disclosure is not limited to this. In the case where a notification regarding update failure is not made from the vehicle-mounted ECUs 3 to which the update program was transmitted in the period from when the individual update programs were transmitted to, for example, when a predetermined period has passed, or the value of the cumulative running time of the vehicle C, the number of trips, the distance travelled, and the like reaches a predetermined value, the control unit 20 of the vehicle-mounted update apparatus 2 may determine that the updates according to the transmitted update programs were successful. In the case of a notification regarding failure of an update being made, the control unit 20 of the vehicle-mounted update apparatus 2 may determine that the update according to the update program failed. When the update programs are applied, the control unit 20 of the vehicle-mounted update apparatus 2 can deal with the vehicle-mounted ECU 3 that only make a notification regarding update failure.

The embodiments disclosed herein are examples in all respects, and are not to be construed as limiting. The scope of the present disclosure is defined by the claims rather than by the meaning of the description above, and all modifications equivalent to and within the scope of the claims are intended to be encompassed.

The invention claimed is:

1. A vehicle-mounted update apparatus for obtaining update information regarding a plurality of updates and an update program that are transmitted from an outer-vehicle external server, and performing processing for updating a program of a vehicle-mounted ECU installed in a vehicle, the vehicle-mounted update apparatus comprising:
 a control unit configured to be communicably connected to the vehicle-mounted ECU and to control transmission of the update program to the vehicle-mounted ECU,
 wherein the control unit is configured to:
 determine, based on the update information, a transmission order in which update programs respectively corresponding to the plurality of updates are to be transmitted to the vehicle-mounted ECU,
 store, in a storage unit of the vehicle-mounted update apparatus, the determined transmission order in association with version numbers of the update programs,
 transmit the update program corresponding to a single update of the plurality of updates and a self-diagnosis processing program for the vehicle-mounted ECU to perform self-diagnosis processing to the vehicle-mounted ECU, based on the determined transmission order,
 determine success or failure of the single update of the vehicle-mounted ECU based on a result of the self-diagnosis processing performed by the vehicle-mounted ECU according to the self-diagnosis processing program,
 transmit the update program next in the transmission order to the update program corresponding to the single update to the vehicle-mounted ECU, if the single update is determined as having succeeded, and
 interrupt the plurality of updates without transmitting the update program next in order to the vehicle-mounted ECU, if the single update is determined as having failed.

2. The vehicle-mounted update apparatus according to claim 1, wherein a storage unit of the vehicle-mounted ECU includes two storage areas for respectively storing a current version program currently being executed and an old version program previously executed,
 the vehicle-mounted ECU stores the update program transmitted from the control unit in the storage area in which the old version program is stored, switches the update program thus stored in the storage area as the current version program, and transmits information regarding a switch result, and
 the control unit determines success or failure of the single update of the vehicle-mounted ECU based on the information regarding the switch result transmitted from the vehicle-mounted ECU.

3. The vehicle-mounted update apparatus according to claim 2, wherein there are a plurality of the vehicle-mounted ECUs to which the update program corresponding to the single update is to be transmitted, and
 the control unit determines that the single update was successful if the switch result transmitted from all of the vehicle-mounted ECUs to which the update program corresponding to the single update is transmitted is normal.

4. The vehicle-mounted update apparatus according to claim 1, wherein a storage unit of the vehicle-mounted ECU includes two storage areas for respectively storing a current version program currently being executed and an old version program previously executed,
 the vehicle-mounted ECU stores the update program transmitted from the control unit in the storage area in which the old version program is stored, and transmits information regarding a result of self-diagnosis performed on the update program thus stored in the storage area, and
 the control unit determines success or failure of the single update of the vehicle-mounted ECU based on the information regarding the self-diagnosis result transmitted from the vehicle-mounted ECU.

5. The vehicle-mounted update apparatus according to claim 4,
 wherein there are a plurality of the vehicle-mounted ECUs to which the update program corresponding to the single update is to be transmitted, and
 the control unit determines that the single update was successful if the self-diagnosis result transmitted from all of the vehicle-mounted ECUs to which the update program corresponding to the single update was transmitted is normal.

6. An update processing program for causing a computer to execute processing for:
 obtaining update information regarding a plurality of updates and an update program that are transmitted from an outer-vehicle external server;
 determining, based on the update information, a transmission order in which update programs respectively corresponding to the plurality of updates are to be transmitted to the vehicle-mounted ECU;
 storing, in a storage unit of the computer, the determined transmission order in association with version numbers of the update programs,
 transmitting the update program corresponding to a single update of the plurality of updates and a self-diagnosis processing program for the vehicle-mounted ECU to perform self-diagnosis processing to the vehicle-mounted ECU, based on the determined transmission order;
 determining success or failure of the single update of the vehicle-mounted ECU based on a result of the self-diagnosis processing performed by the vehicle-mounted ECU according to the self-diagnosis processing program;

transmitting the update program next in the transmission order to the update program corresponding to the single update to the vehicle-mounted ECU, if the single update is determined as having succeeded; and interrupting the plurality of updates without transmitting the update program next in order to the vehicle-mounted ECU, if the single update is determined as having failed.

7. A program update method comprising:

obtaining update information regarding a plurality of updates and an update program that are transmitted from an outer-vehicle external server;

determining, based on the update information, a transmission order in which update programs respectively corresponding to the plurality of updates are to be transmitted to the vehicle-mounted ECU;

transmitting the update program corresponding to a single update of the plurality of updates and a self-diagnosis processing program for the vehicle-mounted ECU to perform self-diagnosis processing to the vehicle-mounted ECU, based on the determined transmission order;

determining success or failure of the single update of the vehicle-mounted ECU based on a result of the self-diagnosis processing performed by the vehicle-mounted ECU according to the self-diagnosis processing program;

transmitting the update program next in the transmission order to the update program corresponding to the single update to the vehicle-mounted ECU, if the single update is determined as having succeeded; and interrupting the plurality of updates without transmitting the update program next in order to the vehicle-mounted ECU, if the single update is determined as having failed.

\* \* \* \* \*